US006616837B2

(12) United States Patent

Tovar De Pablos et al.

(10) Patent No.: US 6,616,837 B2

(45) Date of Patent: Sep. 9, 2003

(54) APPARATUS FOR THE OPTIMIZATION OF THE RHEOLOGICAL CHARACTERISTICS OF VISCOUS FLUIDS

(75) Inventors: Juan Jose Tovar De Pablos, Aberdeen (GB); Philip Gilbert McCurdy, Aberdeen (GB)

(73) Assignee: Innovative Engineering Systems, Ltd., Aberdeen (GB)

( * ) Notice: Subject to any disclaimer, the term of this patent is extended or adjusted under 35 U.S.C. 154(b) by 0 days.

(21) Appl. No.: 09/753,939

(22) Filed: Jan. 3, 2001

(65) Prior Publication Data

US 2002/0084224 A1 Jul. 4, 2002

(51) Int. Cl.[7] ......................... B01D 35/06; E21B 37/00; F17D 1/08; F17D 3/00

(52) U.S. Cl. ...................... 210/222; 210/418; 166/66.5; 166/66.6; 166/66.7; 166/320; 137/509; 137/517

(58) Field of Search ................................ 210/222, 695, 210/418; 166/66.5, 66.6, 66.7, 320; 137/509, 517

(56) References Cited

U.S. PATENT DOCUMENTS

| | | | | |
|---|---|---|---|---|
| 4,033,151 A | | 7/1977 | Jansen | |
| 4,065,361 A | | 12/1977 | Hanson | |
| 4,357,237 A | | 11/1982 | Sanderson | |
| 4,372,852 A | | 2/1983 | Kovacs | |
| 4,716,024 A | | 12/1987 | Pera | |
| 4,858,644 A | * | 8/1989 | Decker | 137/517 |
| 4,933,151 A | | 6/1990 | Song | |
| 5,024,271 A | | 6/1991 | Meihua | |
| 5,052,491 A | | 10/1991 | Harms et al. | |
| 5,454,943 A | | 10/1995 | Ashton et al. | |
| 5,673,721 A | | 10/1997 | Alcocer | |
| 5,752,547 A | * | 5/1998 | Rosenberg | 137/509 |
| 5,783,074 A | | 7/1998 | Stanley | |
| 5,904,839 A | | 5/1999 | Brons | |
| 5,959,194 A | | 9/1999 | Nenniger | |
| 6,241,015 B1 | * | 6/2001 | Pringle et al. | 166/66.7 |

FOREIGN PATENT DOCUMENTS

| | | |
|---|---|---|
| EP | 0 317 186 A2 | 5/1989 |
| EP | 0 726 193 A2 | 8/1996 |

* cited by examiner

*Primary Examiner*—David A. Reifsnyder

(74) *Attorney, Agent, or Firm*—Brown, Martin, Haller & McClain LLP

(57) ABSTRACT

An apparatus for optimizing the rheological properties of a viscous fluid is particularly designed to reduce the viscosity of the fluid so that it may be more readily transported from a subsurface reservoir to the surface. The apparatus includes housing having a first through bore defining a cross-sectional flow area and longitudinal flow path for fluid through the bore. The housing has an inlet end and an outlet end and is designed for connection in a flow path from a subsurface reservoir. A flow restriction device is adjustably mounted in the through bore to define a reduced area orifice of adjustable size for restricted flow, so as to accelerate the fluid and produce shear. A magnetic unit may also be selectively connected to the housing to produce a magnetic field across the fluid, further reducing viscosity.

10 Claims, 2 Drawing Sheets

APPARATUS FOR THE OPTIMIZATION OF THE RHEOLOGICAL CHARACTERISTICS OF VISCOUS FLUIDS

BACKGROUND OF THE INVENTION

The present invention relates to an apparatus for optimizing or improving the rheological characteristics of viscous fluids.

It is a common practice in the oil and gas industry to produce viscous hydrocarbons from subsurface reservoirs using artificial lift methods. These methods relate mainly to pumping devices such as centrifugal, positive displacement or progressive cavity type of pumps. In some reservoirs producing high viscosity hydrocarbons, the natural reservoir energy is sufficient to allow the fluids to flow unaided to the surface. However, there are very few reservoirs where this is the case. This is due to the very high friction losses created by the particular Theological properties of the fluids. It is therefore necessary to overcome such losses using artificial means like pumps, in order to make exploitation of the hydrocarbons economically viable.

Devices such as pumps required a source of energy to be operated. In most cases, either mechanical or electrical energy is transmitted to the pump in order to produce fluids. Therefore, continuous production of viscous hydrocarbons requires a significant amount of energy, mainly electricity. In addition, a pump system breakdown require that the unit is removed from the well and replaced. The overall cycle of installing the pumps, producing the fluids and replacing the pump units after failure is time consuming and expensive. However, the most costly part is the production phase which requires very high levels of continuous energy in order to produce the fluids. Most of this energy is dissipated as friction losses either in the pump or in the piping system transporting the fluids to the surface.

Mechanical and magnetic treatment of fluids has been carried out in various industries over the last 25 years. In the case of magnetic energy, the main effect on the fluid has been to add energy to the atomic levels of the fluid. Scale deposition in pipes and surfaces can be inhibited with this process in which the energy added to the fluid by the magnetic field will increase the magnitude of the atoms's repulsion forces that hold the scale particles in suspension (U.S. Pat. No. 4,357,2347). Hydrocarbons can be treated using magnetic fields in order to prevent wax and paraffin deposition in pipes and surfaces (U.S. Pat. Nos. 5,454,943; 5,052,491; 5,024,271; 4,033,151). Magnetized fluids are also used in applications where the viscosity of the fluid needs to be controlled, they are normally composed of suspensions of micron-sized, magnetizable particles in a medium such as water or oil. European Patent EP 317186 represents this application for cooling fluids in motor cars in which the viscosity of the fluid is varied depending on the temperature and engine speed. EP 726193 presents a similar application where a magnetized fluid is subjected to a magnetic field which varies its viscosity, hence reducing the resistance to move between the two pieces. None of the inventions described above addresses the combined effect of mechanical and magnetic energy for the sole purpose of modifying the viscosity of viscous fluids (mainly hydrocarbons) deep in the underground wells and reservoirs.

SUMMARY OF THE INVENTION

It is an object of the present invention to provide a new and improved apparatus for the optimization of the rheological characteristics of viscous fluids such as hydrocarbons, such that less power is required to pump such fluids from a subsurface reservoir to the surface.

According to the present invention, an apparatus for optimizing the rheological properties of a viscous fluid is provided, which comprises a housing having a through bore defining a cross-sectional flow area for fluid through the bore, the through bore having an inlet end for connection to a supply of a viscous fluid and an outlet end, a flow restriction device in the through bore defining a reduced area orifice for restricted flow, and an adjustment device for varying the size of the orifice. A magnetic field source may be selectively secured to the housing for generating a magnetic field across at least part of the through bore.

The housing is designed to be lowered into a well and connected in line with production tubulars linking a subsurface reservoir to the surface. The housing is suitably placed close to the junction between the reservoir and the flow path or tubulars connecting the reservoir to the surface.

In an exemplary embodiment, one or more magnetic units are provided for selectively securing to the housing to generate an adjustable magnetic field for fluids which are sensitive to both shear and magnetic field. However, for fluids which are not sensitive to shear, the magnetic field source may be used alone, and the flow restriction device may be used independently for fluids not sensitive to magnetic fields.

In one embodiment of the invention, the magnetic unit comprises at least one sleeve releasably secured in the through bore at one end of the housing, and contains one or more permanent magnets. Alternatively, sleeves providing a magnetic field may be releasably secured in both ends of the bore, with the flow restriction device located between the two sleeves.

The housing is designed to be mounted in a production line for fluid such as hydrocarbons from a subsurface reservoir, such that reservoir fluids are induced to flow through the housing to the surface. Optimization or conditioning of the rheological characteristics, or viscosity, is accomplished by the action of the magnetic field and/or the acceleration of the fluid across the small flow area orifice where shearing takes place. The time and magnitude of both the mechanical action provided by the flow restriction device, and the magnetic field acting on the fluid, will be determined by the characteristics of the fluid, reservoir, and the well.

The apparatus is capable of substantially reducing the viscosity of a fluid to levels where significant energy savings are realized. As a result, wells such as oil wells with pumps will require much less energy to pump the oil to the surface. In some cases, pumps or other artificial lift means may not even be needed, making the economics of installing and running the wells much more attractive.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

Figure 1:
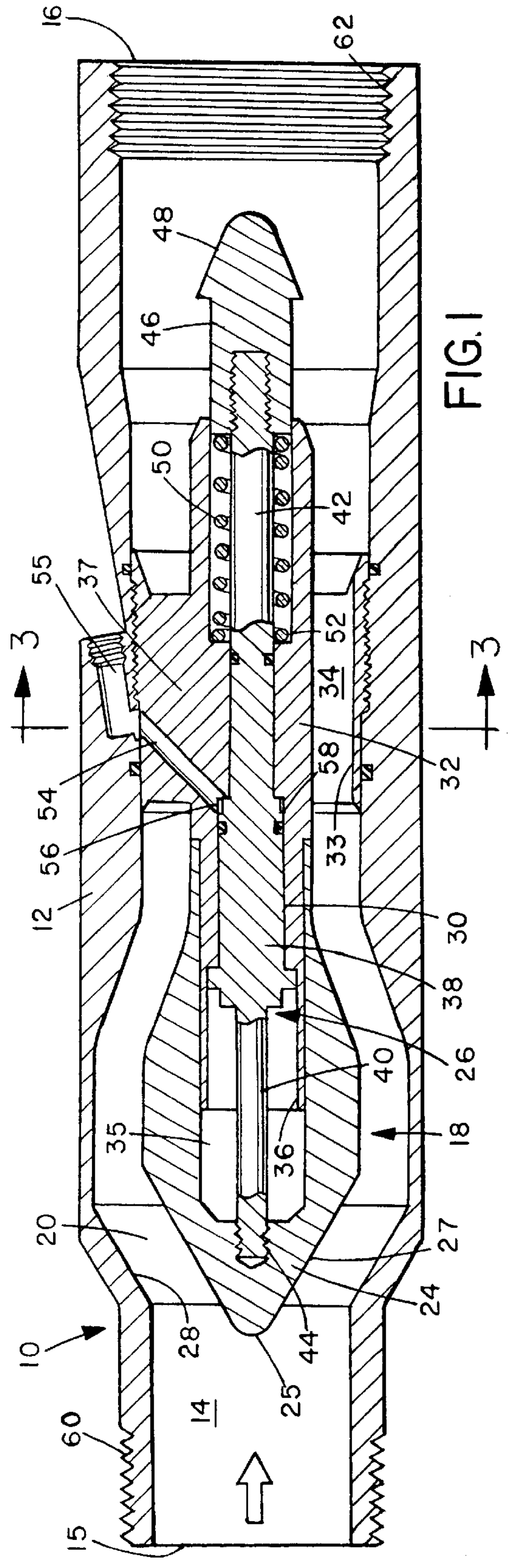
FIG. 1 is a diametrical sectional view of an apparatus according to an exemplary embodiment of the invention in the fully open position.
Figure 2:
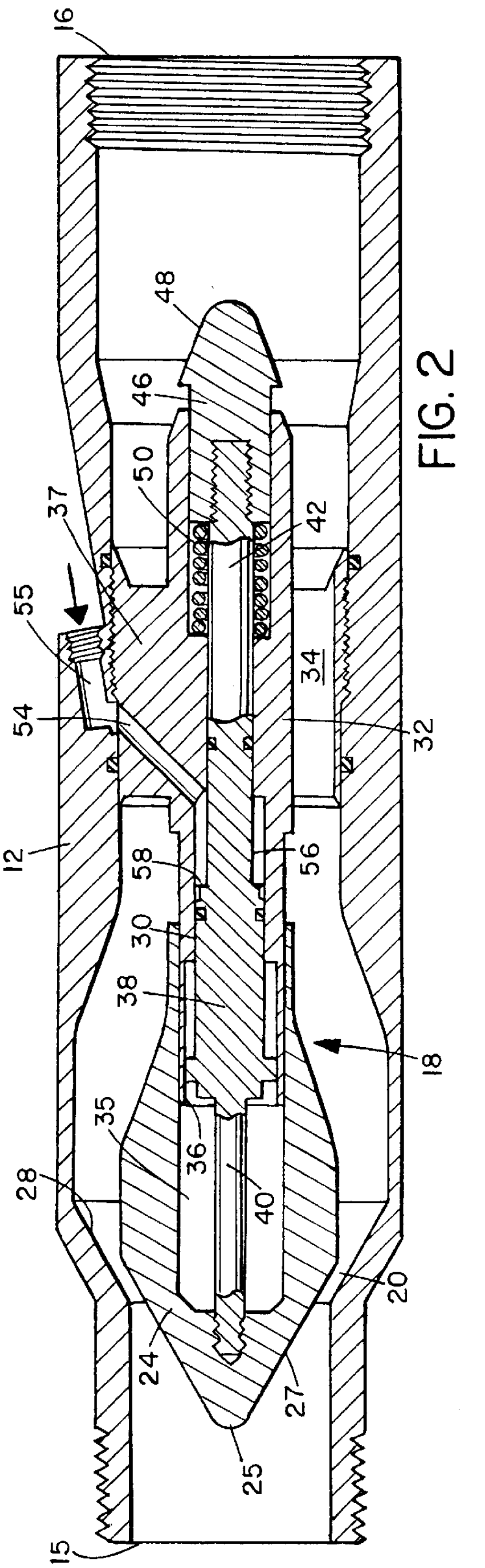
FIG. 2 is a similar view with the mechanism in a restricted flow position.
Figure 3:
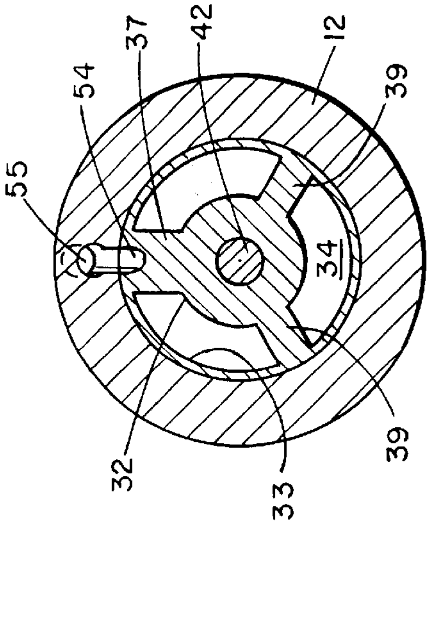
FIG. 3 is a sectional view taken on line 3—3 of FIG. 1.

FIGS. 1 to 3 illustrate an apparatus 10 for controlling the rheological properties of a viscous fluid according to an exemplary embodiment of the present invention. The apparatus 10 basically comprises an outer cylindrical housing 12 having a through bore 14 with an inlet end 15 and an outlet end 16. The housing is particularly intended to be secured in a supply line from a subsurface reservoir to a surface well, such as an oil well, so that fluid traveling along the line will enter the inlet 15, travel through the bore 14, and exit at outlet end 16 of the housing to continue along the line or production tubulars, or through a pump.

Figure 4:
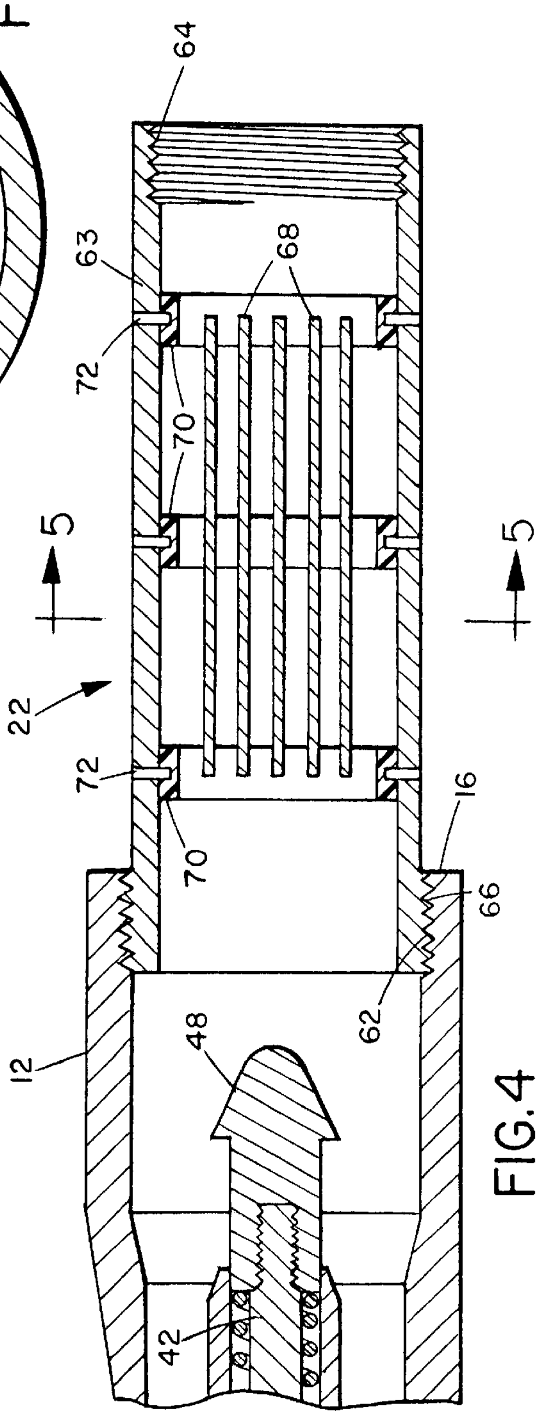
FIG. 4 is a view similar to a portion of FIG. 1, with a magnetic flow chamber attached.

The housing 12 contains a first, mechanical device for providing a mechanical or shear action on the fluid passing through the bore. The mechanical device comprises a controllable flow restriction device 18 which defines an annular orifice 20 in the through bore which has a cross-sectional flow area dependent on the position of the flow restriction device 18. A magnetic device for producing a magnetic field in the bore to modify the properties of fluids which are sensitive to magnetic fields may optionally be secured at either or both ends of housing 12, as indicated in FIG. 4. The magnetic device may comprise any suitable arrangement of permanent magnets or electromagnets positioned to produce a magnetic field in the bore. In the illustrated embodiment, the magnetic device comprises magnetic units 22 which may be releasably mounted in the opposite ends of the bore 14, as described in more detail below with reference to FIGS. 4 and 5.

The flow restriction device 18 basically comprises a member 24 having a profiled nose cone 25 which is secured to a piston 26. Nose cone 25 has an inwardly tapering, conical portion 27 facing a correspondingly tapered portion 28 of through bore 14 to define the annular orifice or flow restriction 20. Piston 26 is slidably mounted in a through bore 30 in central body 32. As best illustrated in FIG. 3, central body 32 has an outer sleeve or ring 33 threadably secured in the housing through bore 14, and secured to central body 32 via three radial support legs 37,39. Ports or passageways 34 for fluid flow from the upstream side to the downstream side of body 32 are provided between the legs 37 and 39. The nose cone 25 has a bore 35 slidably engaged over a projecting cylindrical guide portion 36 of the central body 32, so that the flow restriction device is guided for axial movement in the bore 14.

The piston 26 has an enlarged actuating portion 38, and first and second stem portions 40,42 projecting in opposite directions from actuating portion 38. The first stem portion 40 extends through bore 35 in nose cone 24 and is threadably secured in a threaded counterbore 44 at the inner end of bore 35. The second stem portion 42 projects from the actuating portion of the piston out of the bore 30 in the opposite direction to stem portion 40, and is secured to an enlarged end cap 46 at its outer end, which has a rounded or profiled end portion 48. A return spring 50 acts between a shoulder 52 in through bore 30 and the end cap 46 in order to bias the piston 26 and nose cone 24 into the retracted position of FIG. 1 in which the orifice 20 is at its maximum cross-sectional area.

The support leg 37 of the central body 32 has a passageway or port 54 which connects a control input 55 through the outer housing with a control chamber 56 within bore 30 in which a shoulder 58 on piston 26 is located. Control input 55 is selectively connected to a supply of pressurized fluid which then fills chamber 56, acting on shoulder 58 in order to urge the piston and attached nose cone downwardly, sliding the conically tapered portion 27 of the nose cone towards the corresponding seat portion 28 of the through bore 14, and reducing the size of orifice 20, as illustrated in FIG. 2. The resultant reduction in the flow area induces shearing in the fluids flowing through the apparatus. As the pressure is increased, the flow area is reduced and the amount of shearing in the fluid is increased. The conically tapered portion 27 of the nose cone is scalloped to provide grooves or indents so that fluids can still pass through the bore even when the piston is at its maximum displacement with the portion 27 seated against seat portion 28.

The position of the flow restriction device 18 may therefore be adjusted between the two positions illustrated in FIGS. 1 and 2 to control the shear effect on the fluid as it flows through orifice 20. FIG. 1 illustrates a low shear position where the flow restriction device is in the fully retracted position, and the orifice 20 is at its maximum cross-sectional area. By controlling the amount of fluid supplied to chamber 56, the flow restriction device 18 can be moved downwardly to reduce the area of orifice 20 and increase the shear on the fluid. FIG. 2 illustrates a high shear position where the orifice 20 is at a small cross-sectional area. It will be understood that device 18 may be controlled to be moved to any selected position between the end position illustrated in FIG. 1 and a fully extended position in which the nose cone 25 contacts the tapered surface 28.

Figure 5:
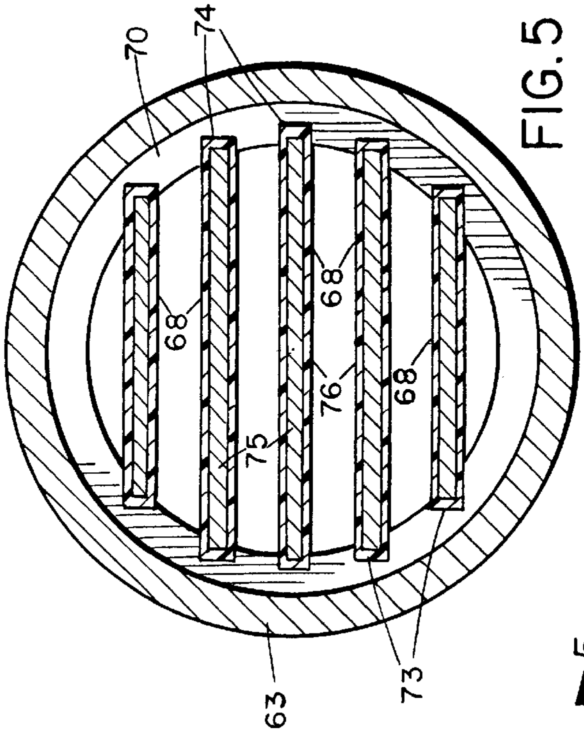
FIG. 5 is an enlarged sectional view taken on line 5—5 of FIG. 4.

The opposite ends of housing 12 have screw threads 60,62 for optional connection of the housing to tubulars or to magnet units 22 for further treatment of the fluid. A magnet unit 22 is illustrated attached to the outlet end of housing 12 in FIG. 4, while FIG. 5 illustrates more details of the magnet housing assembly. It will be understood that a similar assembly may optionally be secured to the opposite end of the housing, if additional treatment is desired.

As illustrated in FIGS. 4 and 5, each magnet unit 22 comprises an outer cylindrical housing or sleeve 63 of stainless steel or the like which has internal screw threads 64 at one end, and external threads 66 at the opposite end, and a series of flat magnet devices 68 mounted parallel to one another across the interior of housing 63. The threads 64,66 are arranged for threaded engagement in the threaded portions 60 or 62, respectively, at either end of housing 12. A series of three spaced annular mounting rings 70 of plastic or the like are mounted in sleeve 63, and may be held in place by screws 72 extending through the outer steel body of the sleeve. Each ring 70 has a first set of longitudinal grooves 73 extending along one side, and a second set of longitudinal grooves 74 extending along the opposite side, with each groove 73 of the first set aligned with a corresponding groove 74 of the second set, and the grooves 73,74 in each ring aligned with the grooves 73,74, respectively of the other two rings.

The magnet devices 68 are slidably engaged at their opposite side edges in respective opposing grooves 73,74, as best illustrated in FIG. 5, so that the devices extend parallel to one another across the bore. The magnet devices may be held in place in any suitable manner, such as a snap fit engagement at one end, epoxy resin adhesive, or other securing device. Each magnet device may comprise a unitary flat plate magnet, but in the illustrated embodiment each device comprises a magnetic material 75 encapsulated in an outer cover layer 76 of plastic or non-ferrous metal which provides additional support and resistance against breakage. This arrangement is particularly suitable where the magnets 74 are of a rare earth material such as Samarium Cobalt or Neodymium Iron Boron which is inherently brittle and cannot be manufactured as a flat, stand-alone plate.

The arrangement is such that the magnetic field produced by the magnet devices is generated in a direction at right angles or transverse to the direction of fluid flow through unit 22. The mounting rings 70 will be provided in various different configurations with different numbers of grooves, to allow a larger or a smaller number of magnetic devices 68 to be installed, depending on the level of magnetic flux required. Thus, different numbers of plate magnets may be readily inserted by replacing rings 70 with other rings having a greater or lesser number of grooves. This provides a considerable amount of flexibility in the level of magnetic flux applied to the fluid. The plastic rings 70 will create an insulating gap between the magnets and the stainless steel outer housing, preventing flux leakage. The outer cover layer 76 supporting each magnet 75 also provides a corrosion barrier to protect the magnets, and prevents any ferritic debris from becoming directly stuck to the magnets.

The magnetic units 22 will only be used when the fluid to be treated is sensitive to magnetic fields. When the fluid to be treated is not sensitive to magnetic fields, units 22 will be removed and the flow restricting device 18 alone is used to regulate the properties of the fluid. Typically, each housing or sleeve 63 will be of the order of five feet in length, and more than one sleeve may be secured in series at either end, or both ends, of housing 12, in order to vary the level of magnetic treatment. Instead of permanent magnets, electromagnets may be used and the magnetic field may then be regulated by varying the amount of electricity supplied to the magnets.

By applying a magnetic field to a fluid which is sensitive to such fields, rheological characteristics of the fluid such as viscosity may be varied. The viscosity may be reduced by the combined effect of the magnetic field and the shearing produced at orifice 20 to levels where significant energy savings may be realized. As a result, wells using pumps to convey fluids to the surface will require much less electricity. In some cases, there may be no need to use any artificial lifting devices, making economic development much more practical. The magnitude of the mechanical shearing action and the magnetic fields will be varied depending on the characteristics of the fluid to be conveyed, the reservoir, and the well. Thus, for certain fluids, the magnetic assemblies will not be used, and a mechanical shearing action only will be applied. In other cases, where magnetic field sensitive fluids are conveyed, one, two, or more magnetic housings or sleeves may be secured to housing 12 to produce the desired reduction in viscosity.

Although an exemplary embodiment of the invention has been described above by way of example only, it will be understood by those skilled in the field that modifications may be made to the disclosed embodiment without departing from the scope of the invention, which is defined by the appended claims.

We claim:

1. An apparatus for optimizing the rheological properties of a viscous fluid, comprising:

a housing for connection in a flow path from a subsurface reservoir to the surface, the housing comprising first and second parts, each part having a through bore;

the through bore of the first part having an inlet end for connection to a supply of a viscous fluid in a subsurface reservoir and an outlet end;

a flow restriction device in the through bore of the first part of the housing defining a reduced area orifice for restricted flow;

an adjustment device for varying the size of the orifice; and a plurality of magnetic elements in the through bore of the second part of the housing such that the flow of a viscous fluid from a sub surface reservoir to the surface is transverse to the magnetic field of the plurality of magnetic elements.

2. The apparatus as claimed in claim 1, including a series of spaced plastic mounting rings releasably secured in the second part of the housing for supporting said magnetic elements, the mounting rings including different mounting rings for supporting different numbers of magnets, whereby the level of magnetic flux may be varied by inserting different sets of rings and magnets.

3. The apparatus as claimed in claim 1, wherein the flow restriction device is movably mounted in the first part of the housing for positioning at any location within the first part of the housing, such that movement between said flow restriction device and the first part of said housing will result in a change in the size of said orifice.

4. An apparatus for optimizing the rheological properties of a viscous fluid, comprising:

a housing for connection in the flow path from a subsurface reservoir to the surface, the housing having a first through bore defining a cross-sectional flow area and a longitudinal flow path for fluid through the bore;

the through bore having an inlet end for connection to a supply of a viscous fluid in a subsurface reservoir and an outlet end;

a flow restriction device in the through bore defining a reduced area orifice for restricted flow;

an adjustment device for varying the size of the orifice: and at least one magnetic assembly for selective connection to one end of the housing, the assembly having a second through bore for communicating with said first through bore in the housing, and a magnetic field source for generating a magnetic field across at least part of the second through bore in a direction transverse to the fluid flow path.

5. The apparatus as claimed in claim 4, wherein the magnetic field source comprises a plurality of spaced, parallel permanent magnets mounted across the second through bore.

6. The apparatus as claimed in claim 3, wherein the magnetic assembly further includes a series of spaced plastic mounting rings releasably secured in the second bore and supporting said magnets, the assembly including different rings for supporting different numbers of magnets, whereby the level of magnetic flux may be varied by inserting different sets of rings and magnets.

7. The apparatus as claimed in claim 6, including an actuating assembly in said first through bore for moving said flow restriction device to a selected location between said end positions, said assembly comprising a cylinder secured in said through bore and a piston slidably mounted in said cylinder, said flow restriction device being secured to said piston, said cylinder having an actuating chamber, a passageway through said housing and cylinder connecting said actuating chamber to a supply of pressurized fluid for urging said piston and flow restriction device towards said second position, and biasing means urging said piston and flow restriction device towards said first position when pressure in said chamber is reduced.

8. The apparatus as claimed in claim 4, including a plurality of magnetic assemblies secured in series with said housing.

9. The apparatus as claimed in claim 4, wherein the flow restriction device is movably mounted in the housing for positioning at any location between first and second end positions, the first through bore having a seat, said orifice comprising an annular opening between said flow restriction device and seat, said first position being at a maximum spacing from said seat and said second position being at a minimum spacing from said seat.

10. The apparatus as claimed in claim 9, wherein said flow restriction device comprises a tapered, conical member and the seat is of a conical shape matching that of said conical member.

* * * * *